US008718433B2

(12) United States Patent
Billman et al.

(10) Patent No.: US 8,718,433 B2
(45) Date of Patent: May 6, 2014

(54) INSTALLATION TOOL WITH INTEGRATED VISUAL FAULT INDICATOR FOR FIELD-INSTALLABLE MECHANICAL SPLICE CONNECTOR

(75) Inventors: Bradley S. Billman, Denton, TX (US); David W. Meek, Ft. Worth, TX (US); Scott E. Semmler, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/707,016

(22) Filed: Feb. 17, 2010

(65) Prior Publication Data
US 2010/0142905 A1 Jun. 10, 2010

Related U.S. Application Data

(63) Continuation of application No. 11/340,366, filed on Jan. 26, 2006, now Pat. No. 7,680,384.

(51) Int. Cl.
*G02B 6/00* (2006.01)
(52) U.S. Cl.
USPC ........................................................ 385/134
(58) Field of Classification Search
USPC ........................................................ 385/134
See application file for complete search history.

(56) References Cited

U.S. PATENT DOCUMENTS

| 4,030,809 | A |   | 6/1977  | Onishi et al. ................. 350/96 C |
| 4,257,674 | A |   | 3/1981  | Griffin et al. .............. 350/96.21 |
| 4,372,768 | A |   | 2/1983  | Zucker et al. .................. 65/4.21 |
| 4,728,169 | A |   | 3/1988  | Campbell et al. .......... 350/96.15 |
| 4,755,018 | A |   | 7/1988  | Heng et al. ................. 350/96.21 |
| 4,770,488 | A | * | 9/1988  | Shank et al. ..................... 385/79 |
| 4,877,303 | A |   | 10/1989 | Caldwell et al. ........... 350/96.21 |
| 4,881,028 | A | * | 11/1989 | Bright ............................ 324/127 |
| 4,923,274 | A |   | 5/1990  | Dean ........................... 350/96.21 |
| 4,964,688 | A |   | 10/1990 | Caldwell et al. ............. 350/96.2 |
| 5,040,867 | A |   | 8/1991  | DeJong et al. .................. 385/60 |
| 5,261,020 | A |   | 11/1993 | DeJong et al. .................. 385/76 |
| 5,394,496 | A |   | 2/1995  | Caldwell et al. ................ 385/70 |
| 6,173,097 | B1 |  | 1/2001  | Throckmorton et al. ....... 385/59 |
| 6,379,054 | B2 |  | 4/2002  | Throckmorton et al. ....... 385/66 |
| 6,439,780 | B1 |  | 8/2002  | Mudd et al. ..................... 385/83 |

(Continued)

FOREIGN PATENT DOCUMENTS

EP          1136860 A2    9/2001 .............. G02B 6/38

OTHER PUBLICATIONS

Patent Cooperation Treaty, International Preliminary Report on Patentability for International Application No. PCT/US2007/001279, Jul. 29, 2008, 1 page.
Siecor® CAMLITE™ Multimode Connector Procedure for Laser Usage, SRP-006-046, CIRCA 1991, 2 pages.
Siecor® CAMLITE™ Connector Laser Assembly Aid Instructions, SRP-006-048, Issue 3, Sep. 1991, 6 pages.
NORDX/CDT Spec Sheet, FiberExpres Solutions—Optimax Field Installable Connector, two pages, no date.
Panduit Installation Instructions for SC OPTICAM™ Fiber Optic Connectors, six pages, 2005.
Panduit Specification Sheet for SC OPTICAM™ Pre-Polished Fiber Optic Connectors, two sheets, Aug. 2005.

*Primary Examiner* — Ryan Lepisto
*Assistant Examiner* — Erin Chiem (57) ABSTRACT

A mechanical splice fiber optic connector installation tool operable for performing splice terminations and verifying an acceptable splice termination includes a power source, a connector holder, an integrated Visual Fault Locater having an optical transmission element and a display for displaying the status of the termination. An adapter configured to receive the connector and align the connector with the optical transmission element, such that the optical transmission element is spaced apart from the connector at a predetermined distance and is in optical communication with the connector for propagating light energy through the adapter and along the stub optical fiber to a termination area of the connector.

16 Claims, 7 Drawing Sheets

(56) References Cited

U.S. PATENT DOCUMENTS

| | | | |
|---|---|---|---|
| 6,442,318 B1 | 8/2002 | Goldman | 385/114 |
| 6,816,661 B1 * | 11/2004 | Barnes et al. | 385/134 |
| 6,931,193 B2 | 8/2005 | Barnes et al. | 385/134 |
| 2003/0086657 A1 | 5/2003 | Viklund | 385/55 |
| 2004/0258370 A1 * | 12/2004 | Bush et al. | 385/97 |
| 2005/0036744 A1 | 2/2005 | Caveney et al. | 385/87 |
| 2005/0169594 A1 * | 8/2005 | Song | 385/134 |

\* cited by examiner

INSTALLATION TOOL WITH INTEGRATED VISUAL FAULT INDICATOR FOR FIELD-INSTALLABLE MECHANICAL SPLICE CONNECTOR

CROSS-REFERENCE TO RELATED APPLICATIONS

This application is a Continuation of U.S. Ser. No. 11/340,366 filed Jan. 26, 2006, now U.S. Pat. No. 7,680,384 the entire content of which is hereby incorporated by reference in its entirety.

BACKGROUND OF THE INVENTION

1. Field of the Invention

The present invention relates generally to the installation of mechanical splice connectors and verification of proper mechanical splice terminations, and more particularly, to an installation tool with an integrated visual fault indicator for a field-installable mechanical splice connector.

2. Technical Background

Optical fibers are useful in a wide variety of applications, including the telecommunications industry in which optical fibers are employed for voice, data and video transmission. Due, at least in part, to the extremely wide bandwidth and the low noise operation provided by optical fibers, the variety of applications in which optical fibers are being used is continuing to increase. For example, optical fibers no longer serve merely as a medium for long distance signal transmission, but are being increasingly routed directly to the home, and in some instances, directly to a desk or other work location. With the ever increasing and varied use of optical fibers, apparatus and methods have been developed for coupling optical fibers to one another outside the controlled environment of a factory setting, commonly referred to as "field installation" or "in the field," such as in a telephone central office, in an office building, and in various types of outside plant terminals. However, in order to efficiently couple the optical signals transmitted by the fibers, a fiber optic connector must not significantly attenuate, reflect or otherwise alter the optical signals. In addition, fiber optic connectors for coupling optical fibers must be relatively rugged and adapted to be connected and disconnected a number of times in order to accommodate changes in the optical transmission path that may occur over time.

Although fiber optic connectors are most efficiently and reliably mounted upon the end portion of an optical fiber in a factory setting, many fiber optic connectors must be mounted upon the end portion of an optical fiber in the field in order to minimize cable lengths and to optimize cable management and routing. As such, a number of fiber optic connectors have been developed specifically to facilitate field installation. One advantageous type of fiber optic connector that is designed specifically to facilitate field installation is the UNICAM® family of field-installable fiber optic connectors available from Corning Cable Systems LLC of Hickory, N.C. Although the UNICAM® family of field-installable connectors includes a number of common features including a common termination technique (i.e., mechanical splice), the UNICAM® family also offers several different styles of connectors, including mechanical splice connectors adapted to be mounted upon a single optical fiber and mechanical splice connectors adapted to be mounted upon two or more optical fibers. Regardless, each such field-installable connector requires an apparatus for performing the splice termination and thereafter determining whether the continuity of the optical coupling between the field fiber and the stub fiber of the connector is acceptable. Typically, a splice termination is acceptable when a variable related to the optical performance of the connector, such as insertion loss or reflectance, is within a prescribed limit or threshold value.

Installation tools have been developed to facilitate the splice termination of one or more optical fibers to a fiber optic connector, and particularly, to enable the splice termination of one or more field optical fibers to a mechanical splice connector. Examples of conventional installation tools for performing mechanical splices in the field are described in U.S. Pat. Nos. 5,040,867; 5,261,020; 6,816,661; and 6,931,193. In particular, U.S. Pat. Nos. 6,816,661 and 6,931,193 describe a UNICAM® installation tool available from Corning Cable Systems LLC of Hickory, N.C., designed specifically to facilitate mounting the UNICAM® family of fiber optic connectors upon the end portions of one or more field optical fibers. Such an installation tool typically supports a mechanical splice connector, including a ferrule and the splice components, while a field optical fiber is inserted into the connector and aligned with a stub optical fiber. In this regard, the installation tool generally includes a tool base, a tool housing positioned on the tool base, and an adapter provided on the tool housing. The adapter has a first end for engaging the mechanical splice connector that is to be mounted upon the field optical fiber, and an opposed second end that serves as a temporary adapter. The forward end of the mechanical splice connector is received within the first end of the adapter, which in turn is positioned on the tool housing. The end portion of the field optical fiber is then inserted and advanced into the open rear end of the mechanical splice connector and the splice components are subsequently actuated, for example biased together by engagement of the cam member with at least one of the splice components, in order to secure the stub optical fiber and the field optical fiber between the splice components.

Once the fiber optic connector is mounted upon the end portion of the field optical fiber, the resulting fiber optic cable assembly is typically tested end-to-end for acceptable optical continuity. While optical connections and fiber optic cables are tested using a variety of methods, one widely accepted test includes the introduction of light having a predetermined intensity and/or wavelength into one of the stub optical fiber or field optical fiber. By measuring the light propagation through the fiber optic connector, or by measuring the amount of light emanating at the splice points, the continuity of the optical coupling can be determined.

In order to facilitate relatively simple, rapid and inexpensive continuity testing, Corning Cable Systems LLC of Hickory, N.C. has also developed installation tools for field-installable mechanical splice connectors that permit continuity testing while the connector remains mounted on the installation tool. In order to test the continuity of the optical coupling between the field optical fiber and the stub optical fiber, a light source is typically provided to the installation tool for delivering a visible wavelength (e.g., red) laser light to the optical fibers and the termination area. In known apparatus and methods, the visible light is delivered from the light source to the stub fiber through a jumper. The jumper typically includes a length of optical fiber having adapters mounted upon one or more ends of the fiber. As a result, the termination area is illuminated with visible light that produces a "glow" indicative of the amount of light from the stub optical fiber being coupled into the field optical fiber. At least a portion of the connector is formed of a transparent or non-opaque (e.g., translucent) material, for example, the splice components and/or the cam member, so that the glow at the termination area is visible to the operator.

The Corning Cable Systems LLC method for verifying an acceptable splice termination described above is commonly referred to as the "Continuity Test System" (CTS) and the combined functionality of the visible light laser, jumper and test connector are commonly referred to as a "Visual Fault Locator" (VFL). In practice the method is generally sufficient for determining whether the majority of splice terminations are acceptable since the quality of the splice need not be maintained to a high degree of precision and the operator is typically highly-trained and experienced. However, the aforementioned apparatus and methods suffer several shortcomings. Specifically, the aforementioned methods require that an operator keep track of and utilize numerous components, i.e., the jumper, adapter and test connector, in order for the system to properly function. A failure of any of these components will result in a flawed testing process. Additionally, the costs associated with the manufacture and use of the named structural components is excessive.

In view of the aforementioned shortcomings, improved apparatus and methods for performing splice terminations and verifying the acceptance of the same are needed. Such apparatus and methods require that a simplified installation tool incorporating an improved VFL be provided. Further, such apparatus and methods require that the VFL include an integrated adapter having a lens thereon and being operable for receiving a mechanical splice connector, such that the connector may be optically coupled with the VFL. Accordingly, the provisions of incorporating the VFL into the installation tool, eliminates the need for jumpers, adapters and test connectors, thereby permitting less experienced operators to use the system. This results in a lower cost system and method of use. In addition, improved apparatus and methods are also needed to eliminate the subjectivity presently introduced by an operator when verifying an acceptable splice termination in a field-installable fiber optic connector, and to thereby correspondingly increase the accuracy of determining whether a particular splice termination is acceptable. Preferably, such apparatus and methods should accommodate existing field-installable fiber optic connectors, and more preferably, single fiber and multi-fiber field-installable mechanical splice connectors.

SUMMARY OF THE INVENTION

In one aspect, the present invention provides an apparatus and method for performing terminations of optical fibers within mechanical splice fiber optic splice connectors, and thereafter verifying that the terminations are proper. Specifically, the present invention provides a jumperless installation tool for receiving a mechanical splice connector. The installation tool generally comprises a power source, a carriage operable for holding the mechanical splice connector, a camming handle, a crimping handle, an improved visual fault locator (VFL) and a feedback display, thereby providing an integrated tool for performing splice terminations and thereafter testing the continuity of the terminations. By using the installation tool of the present invention, the need for test connectors, jumpers or optical test fibers, and adapters is eliminated. In addition, a space saving, more efficient and more reliable jumperless installation tool is provided. Furthermore, the structural components of the installation tool provided are such that the VFL and a ferrule of the fiber optic connector need not be in actual physical contact, as with conventional apparatus and methods, while optical transmissions are being transmitted.

In a preferred embodiment, the installation tool includes a tool housing for holding the carriage thereupon. The tool housing includes an upper portion and a lower portion operable for housing the power source. The mechanical splice connector is positioned on the carriage such that a cam member of the connector is received within a cam actuator comprising a suitable means for actuating the cam member at the appropriate time to secure a stub optical fiber of the connector and a field optical fiber between one or more splice components. Preferably, the tool housing includes an activation device for activating the VFL to propagate light energy into the termination area.

Also supported within the carriage is the VFL. As indicated, the VFL is operable for electronically gauging the insertion loss of the fiber optic connector at the mechanical splice point or termination area. The VFL generally comprises a VFL shroud having an adapter and a laser diode removably disposed therein. The adapter preferably includes a lens located within and is configured to receive and align the ferrule of the connector with the laser diode of the VFL in such a way that the laser and the adapter are not in physical contact. The VFL shroud is slidably mated with the carriage and is capable of slidable movement in a direction generally parallel to the longitudinal placement of the connector, such that the shroud may be positioned to cover the connector. When in the covered position, the laser diode of the VFL is positioned at a predetermined distance away from the adapter. Accordingly, the laser diode may emit optical signals through the adapter and into the termination area of the connector to insure the optical connection meets acceptable standards. In alternative embodiments, the adapter may be removed and mounted directly upon the ferrule such that the adapter serves the function of a dust cap.

The exemplary embodiment of the installation tool also includes a collecting means for collecting the optical energy propagated by the VFL and emanating from the termination area of the mechanical splice connector. The collecting means is preferably located in a lower portion of the tool housing. The collecting means is operable for detecting the amount of glow emanating from the termination area and collecting the light energy, and preferably receiving that light energy in the form of optical power. The collecting means converts the collected light to an electrical signal using a conventional opto-electronic circuit. Preferably, a predetermined threshold level is stored within the tool. The light emanating from the splice point is collected using the collection means and compared to the threshold level in order to provide a "go" or "no go" signal to an operator display to indicate a proper or improper termination. The feedback display may be complex and display a quantity of measured light energy, or in other preferred embodiments, may be simple and display either an acceptable or unacceptable termination.

The camming handle of the installation tool is provided so as to be slidably engaged and outwardly biased with a side of the tool housing. The camming handle is preferably outwardly biased by a spring type mechanism located within the lower portion of the tool housing. Further, the camming handle preferably includes a gear mechanism that extends outwardly therefrom and into the side of the tool housing so as to matingly engage the means for actuating the cam member of the connector. The camming handle is operable for being compressed inwardly, thereby actuating and rotating cam member of the connector and aligning and optically coupling the stub fiber and the field fiber.

The crimping handle of the installation tool is provided so as to be slidably engaged and outwardly biased with a second side of the tool housing. The crimping handle is preferably outwardly biased by a spring type mechanism located within the lower portion of the tool housing. Further, the crimping handle is operable for being compressed and preferably includes a means for actuating a crimp tube about a strain relieving buffered portion of the field optical fiber, thereby providing additional strain relief to the termination area.

In another aspect of the present invention, the mechanical splice connector is loaded onto the carriage of the tool housing. Thereafter, the VFL shroud is then slid into a closed position such that the ferrule of the connector is received within the adapter of the VFL. Then the field optical fiber is inserted through the rear of the connector such that it is in physical contact with the stub optical fiber. The camming handle is compressed, thereby rotating and actuating the cam member of the connector a predetermined number of degrees and forming the splice termination. In a preferred embodiment, the activation device is activated such that the laser diode emits an optical signal through a lens of the adapter, the focusing the light into the termination area. The collecting means collects the light energy emanating from the termination area and determines if the termination is acceptable or unacceptable. Thereafter, the feedback display indicates an acceptable or unacceptable termination to the operator. If an acceptable termination is achieved, the crimping handling is then actuated, thereby crimping the crimp tube for providing strain relief to the termination area. The VFL shroud is then slid to the open position and the connector is removed from the installation tool.

Additional features and advantages of the invention are set forth in the detailed description which follows and will be readily apparent to those skilled in the art from that description, or will be readily recognized by practicing the invention as described in the detailed description, the drawings and the appended claims.

It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be merely illustrative, and are not intended to limit the scope of the claims in any manner.

DETAILED DESCRIPTION OF THE PREFERRED EMBODIMENTS

Reference will now be made in greater detail to various exemplary embodiments of the invention, preferred embodiments of which are illustrated in the accompanying drawings. Whenever possible, the same reference numerals will be used throughout the drawings to refer to the same or similar parts. A single fiber field-installable mechanical splice connector operable for terminating a field optical fiber to the connector is shown herein for use with the various embodiments of the invention merely for purposes of convenience. It should be understood, however, that the apparatus and methods for performing and verifying an acceptable splice termination disclosed herein may be applied to any optical coupling between any number of optical fibers, such as, but not limited to, any splice termination between adjoining optical fibers wherein light energy can be transmitted to the termination area and the light energy can be detected, collected and measured in the immediate vicinity of the splice joint. Accordingly, the invention should not be construed as being limited in any manner by the example of a single fiber field-installable mechanical splice connector shown and described herein.

Figure 1A:
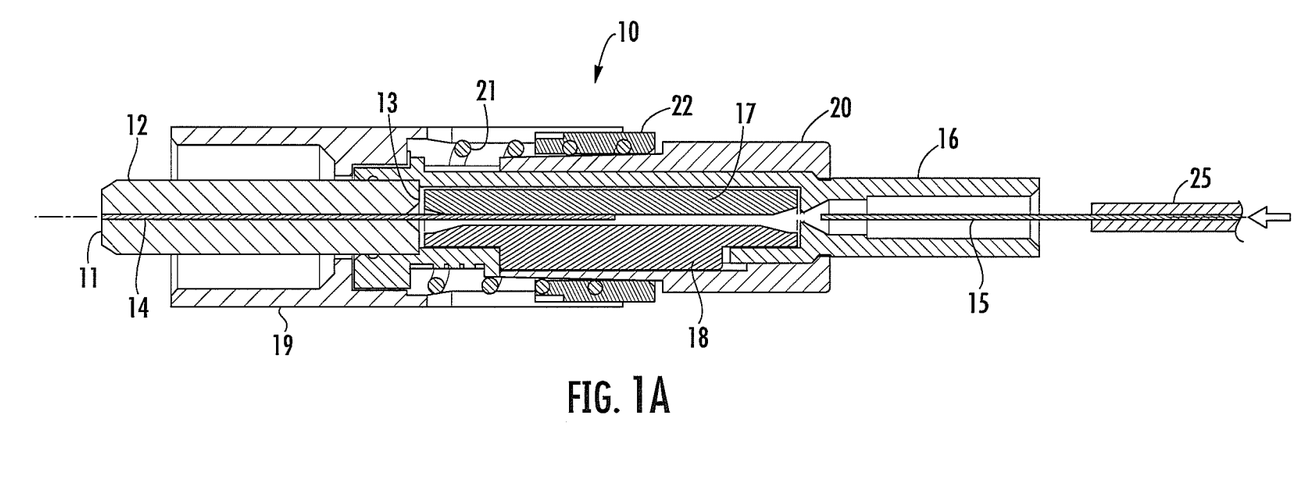
FIG. 1A is a lengthwise cross-sectional view of a conventional fiber optic mechanical splice connector to be mounted on an end portion of a field optical fiber shown with the cam member in the un-actuated position.
Figure 1B:
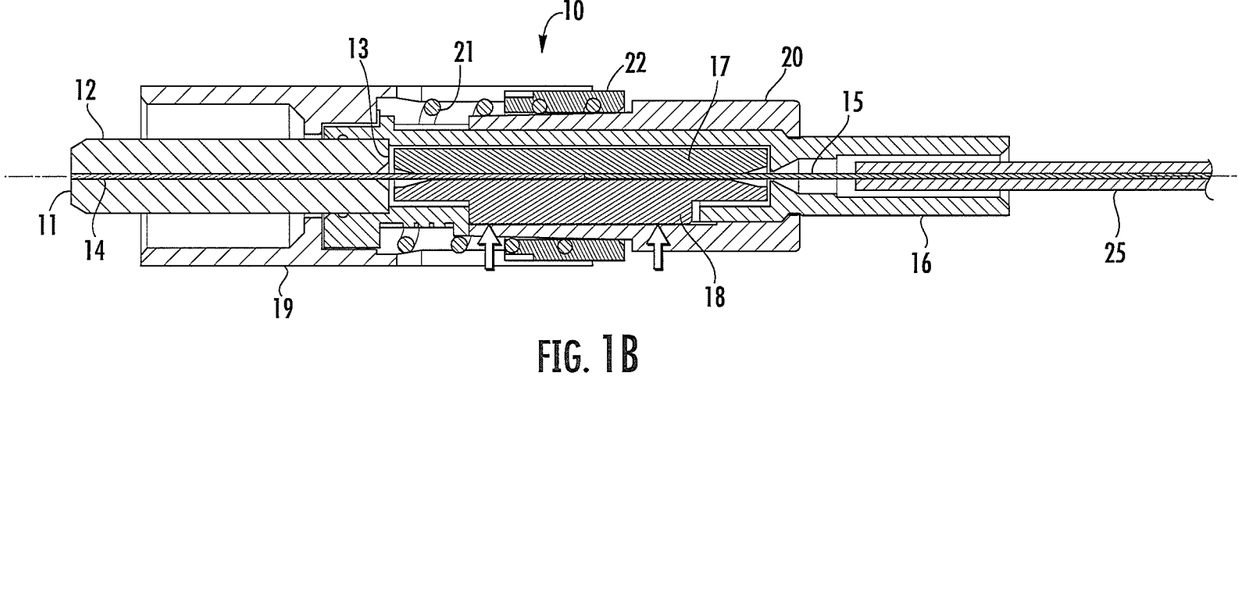
FIG. 1B is a lengthwise cross-sectional view of the mechanical splice connector and the field optical fiber of FIG. 1A shown with the end portions of the stub optical fiber and the field optical fiber positioned within the splice components and the cam member in the actuated position to secure the respective end portions between the splice components.

Referring to FIG. 1A and FIG. 1B, a conventional field-installable, mechanical splice fiber optic connector 10 suitable for use with the present invention is shown. The fiber optic connector 10 is a member of the UNICAM® family of mechanical splice connectors available from Corning Cable Systems, LLC of Hickory, N.C. The connector installation tool and methods described herein are applicable to performing splice terminations and verifying the continuity of the optical couplings between any pair of interconnected optical fibers, and more particularly, between a field optical fiber and an optical fiber of any fiber optic splice connector, including a single fiber or multi-fiber fusion splice or mechanical splice connector. Examples of typical single fiber mechanical splice connectors are provided in U.S. Pat. Nos. 4,755,018; 4,923,274; 5,040,867; and 5,394,496. Examples of typical multi-fiber mechanical splice connectors are provided in U.S. Pat.

Nos. 6,173,097; 6,379,054; 6,439,780; and 6,816,661. As shown herein, the mechanical splice connector 10 includes a connector ferrule 12 defining a lengthwise, longitudinal bore for receiving and securing a stub optical fiber 14 in a known manner, such as by an adhesive. The forward end (also referred to herein as the end face) 11 of the ferrule 12 is typically precision polished such that the stub optical fiber 14 is flush with (as shown) or slightly protruding from the end face of the ferrule 12. However, the stub optical fiber 14 may also protrude outwardly from the end face 11 of the ferrule 12 a predetermined distance, if desired. Furthermore, the end face 11 may be oriented generally perpendicular to the bore to provide an Ultra Physical Contact (UPC) type connector, or may be formed at a predetermined angle to provide an Angled Physical Contact (APC) type connector, in a know manner. In addition, although a single fiber ferrule 12 is shown for purposes of convenience, the ferrule 12 may define a plurality of lengthwise bores therethrough for receiving a corresponding plurality of stub optical fibers to provide a multi-fiber mechanical splice connector.

Regardless, the rear end 13 of the ferrule 12 is inserted into and secured within the forward end of a ferrule holder 16 so that the stub optical fiber 14 extends rearwardly a predetermined distance from the ferrule between a pair of opposed splice components 17, 18 disposed within the ferrule holder. In turn, the ferrule holder 16, including the ferrule 12 and splice components 17, 18, is disposed within a connector housing 19. A cam member 20 is movably mounted between the ferrule holder 16 and the connector housing 19 for engaging a keel portion of the lower splice component 18, as will be described. If desired, the ferrule 12, the ferrule holder 16 and the cam member 20 may be biased relative to the connector housing 19, for example by a coil spring 21, to ensure physical contact between the end face 11 of the ferrule 12 and the end face of an opposing ferrule in a mating fiber optic connector or optical device. Finally, a spring retainer 22 may be disposed between the connector housing 19 and a medial portion of the cam member 20 and fixed to the connector housing so as to retain one end of the spring 21 relative to the connector housing. As a result, the ferrule 12, the ferrule holder 16 and the cam member 20 are biased forwardly, yet permitted to piston rearwardly relative to the connector housing 19.

As illustrated by the horizontal directional arrow in FIG. 1A, a field optical fiber 15 is inserted into the rear end of the ferrule holder 16 opposite the ferrule 12 and the stub optical fiber 14. Although not required, the mechanical splice connector 10 may be provided with a means, for example a lead-in tube (not shown), for guiding the field optical fiber 15 into the ferrule holder 16 and between the splice components 17, 18 in general alignment with the stub optical fiber 14. Preferably, at least one of the splice components 17, 18 has a groove formed therein for receiving the stub optical fiber 14 and the field optical fiber 15. As shown herein, the lower splice component 18 is provided with a lengthwise V-shaped groove for receiving and guiding the stub optical fiber 14 and the field optical fiber 15 into fine alignment. Typically, the field optical fiber 15 is coated or tight-buffered with a buffer 25 that is stripped back to expose a predetermined length of the end of the field optical fiber. The mechanical splice connector 10 may be further provided with a crimp tube or other strain relief mechanism (not shown) for retaining and strain relieving the buffer 25 of the field optical fiber 15. With the buffer 25 removed, the field optical fiber 15 can be inserted and advanced into the rear of the mechanical splice connector 10 between the splice components 17, 18 until the end portion of the field optical fiber 15 makes physical contact with the end portion of the stub optical fiber 14. The cam member 20 is actuated by moving or rotating the cam member 20 relative to the ferrule holder 16 about the longitudinal axis of the connector 10, to engage the keel on the splice component 18 and thereby force the lower splice component 18 in the direction of the upper splice component 17, as illustrated by the vertical directional arrows in FIG. 1B. Movement of the lower splice component 18 causes the end portion of the stub optical fiber 14 and the end portion of the field optical fiber 15 to seat within the V-shaped groove formed in the lower splice component 18, thereby aligning and simultaneously securing the field optical fiber 15 relative to the stub optical fiber 14 between the splice components. Accordingly, the field optical fiber 15 is optically coupled to the stub optical fiber 14. Further, as used herein, the portion of the connector where the optical coupling results is referred to as a "termination area."

If the continuity of the optical coupling between the field optical fiber 15 and the stub optical fiber 14 is acceptable (e.g., the insertion loss is less than a prescribed value and/or the reflectance is greater than a prescribed value), the cable assembly can be completed, for example by strain relieving the buffer 25 of the field optical fiber to the splice connector 10. In the event that the field optical fiber 15 is not in physical contact or is not properly aligned with the stub optical fiber 14, significant attenuation and/or reflectance of the optical signal transmitted along the optical fibers may occur. A slight amount of attenuation and/or reflectance is inevitable at any optical coupling due to the fact that the cores of the optical fibers are not truly concentric and the joint between the optical fibers cannot be formed with the same precision as a continuous optical fiber. Accordingly, the continuity of the optical coupling between the field optical fiber 15 and the stub optical fiber 14 is acceptable when a variable related to the optical performance of the connector, such as insertion loss or reflectance, is within a prescribed limit or meets a predetermined threshold value. In a particular example, the continuity of the optical coupling is sufficient, and therefore the splice termination is acceptable, when the insertion loss at the mechanical splice is less than a prescribed value and/or the reflectance at the mechanical splice is greater than a prescribed value.

Figure 2:
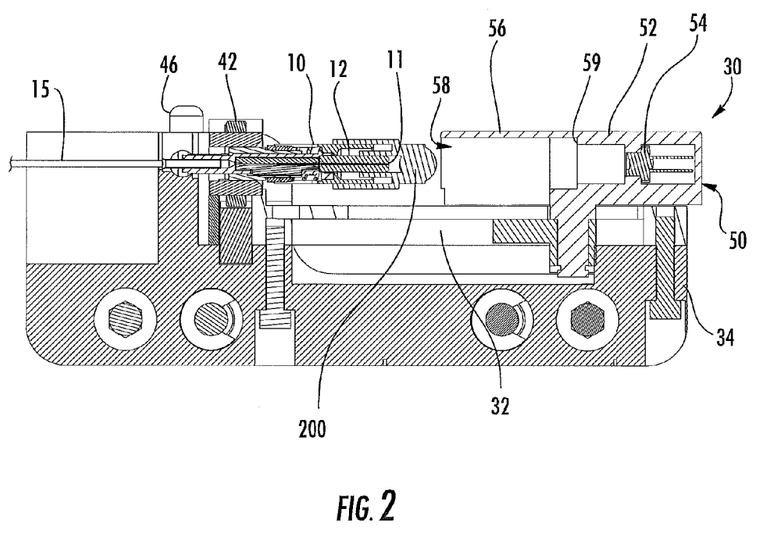
FIG. 2 is a lengthwise cross-sectional view of an installation tool for a field-installable mechanical splice connector operable for terminating a field optical fiber to a stub optical fiber of the connector and for verifying an acceptable splice termination shown in the open position and in accordance with a preferred embodiment of the present invention.
Figure 3:
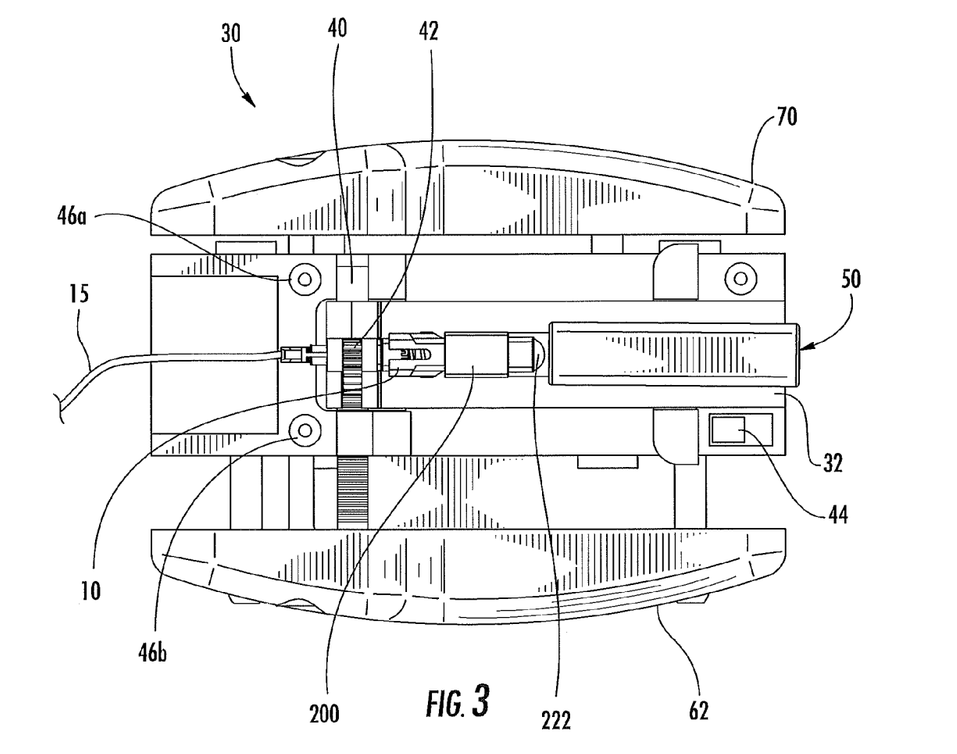
FIG. 3 is a top view of the installation tool shown in FIG. 2.
Figure 4:
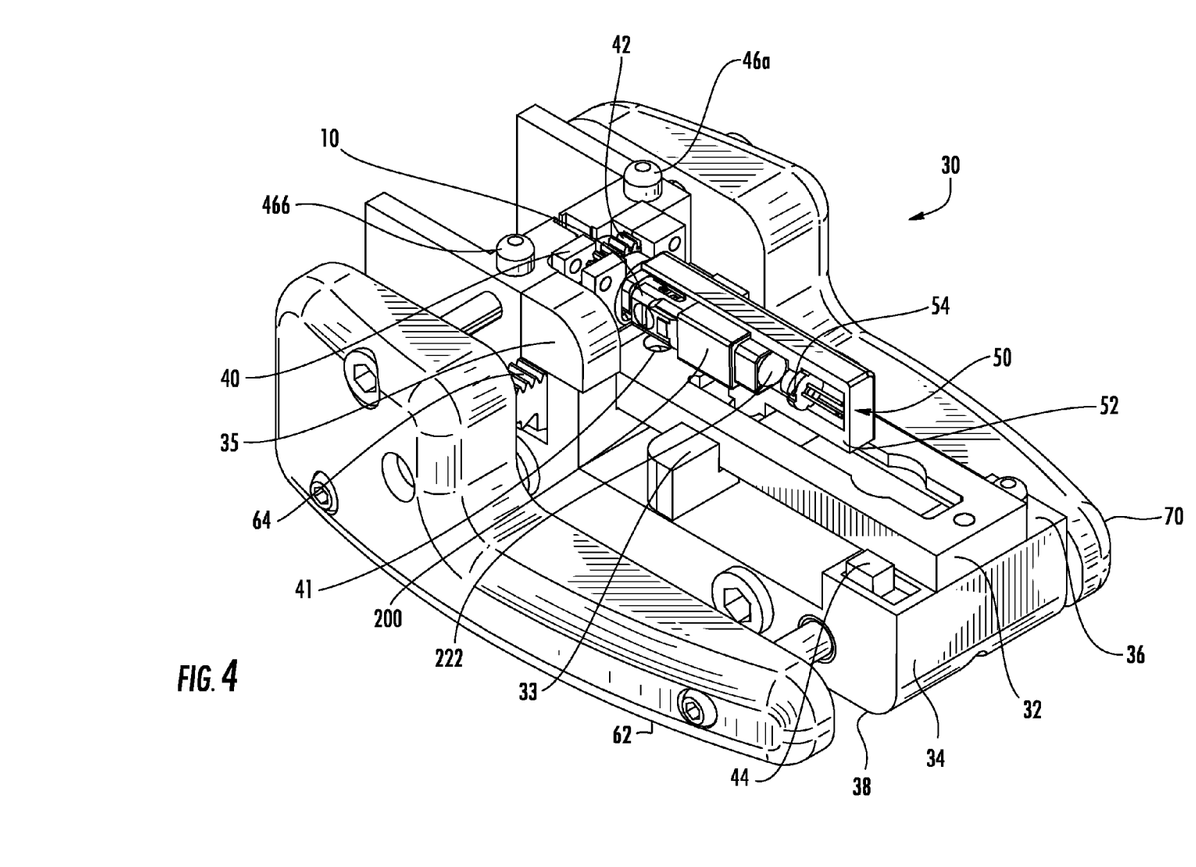
FIG. 4 is an environmental perspective view of the installation tool of FIG. 2 shown with a field-installable mechanical splice connector operable for terminating a field optical fiber to the stub optical fiber of the connector disposed thereon with a visual fault locater in a closed position in accordance with a preferred apparatus and method of the invention.

Referring now to FIGS. 2-4, an installation tool 30 constructed in accordance with one aspect of the present invention is shown for receiving a mechanical splice connector 10. The installation tool 30 generally comprises a power source (not shown), a carriage 32 operable for releasably holding the mechanical splice connector 10, a camming handle 62, a crimping handle 70, an integrated VFL 50 and a feedback display 46, thereby providing an integrated tool for performing splice terminations and thereafter testing the continuity of such terminations. As a result thereof, the need for test connectors, jumpers or optical test fibers, and test adapters is eliminated. In addition, associated cabling problems and/or failures caused by the aforementioned components are also eliminated. As a further result, the integrated installation tool 30 and CTS described herein provides a space saving, more efficient and more reliable jumperless installation and test equipment system for field-installable fiber optic connectors. As shown, the installation tool 30 is configured for use with the field-installable mechanical splice connector 10. However, it is contemplated that the installation tool 30 may be easily modified to be configured for use with field-installable fusion splice connectors. Furthermore, the structural components of the installation tool 30 provided are such that the VFL 50 and the ferrule 12 of the fiber optic connector 10 need not be in actual physical contact while optical transmissions are being transmitted, thereby reducing the possibility of damage to the end face 11 of the ferrule 12, the stub optical fiber 14 or an optical transmission element which may be housed within the VFL 50, as well as increasing the useful life of the VFL 50.

In preferred embodiments, the installation tool 30 is operable for receiving the field-installable fiber optic connector, such as mechanical splice connector 10. The installation tool 30 generally includes the carriage 32 that is positioned upon a tool housing 34 having an upper portion 36 and a lower portion 38 operable for housing the power source. The mechanical splice connector 10 is positioned on the carriage 32 such that the cam member 20 is received within a cam actuator 40 comprising a suitable means, such as a spur gear wrench 42 for actuating the cam member 20 at the appropriate time to secure the stub optical fiber 14 and the field optical fiber 15 between the splice components 17, 18. In preferred embodiments, the tool housing 34 may be provided with a power supply having a laser driver connected to the VFL 50 and an activation device such as a power switch 44 for activating the power supply and the laser driver of the VFL 50 to propagate light energy into the termination area of the fiber optic connector 10 at the appropriate time. Typically, the switch 44 will likewise activate the feedback display 46 to display a visual indication of tool power, and either an acceptable termination or an unacceptable termination. Thus, the display provides a "go" or "no go" visual signal to the operator based upon a comparison of the measured light emanating from the termination point, and a predetermined and preprogrammed threshold value. In alternative embodiments, a second activation device may be provided on the tool housing 34 to separately activate the feedback display 46. The feedback display 46 is illustrated herein as an LED in the embodiment shown in FIGS. 2-4. In particular, the LED 46 comprises a pair of indicators that may be illuminated to represent an acceptable termination 46a or an unacceptable termination 46b.

Preferably, the carriage 32 also includes a connecting means 33 for releasably securing the mechanical splice connector 10 to the upper portion 36 thereof. In preferred embodiments, the connecting means 33 is a spring type mechanism. However, it will be understood by those skilled in the art that any suitable means for releasably securing the mechanical splice connector 10 to the carriage 32 may be employed. Also supported within the carriage 32 is the visual fault locater (VFL) 50.

The VFL 50 generally comprises a VFL shroud or cover 52 having an adapter 200 and a laser diode 54 disposed therein. Preferably, the shroud 52 is constructed from an opaque-type material such that it may shield ambient light from entering or exiting the shroud. However, one skilled in the art will understand that any suitable material may be used for the construction of the shroud 52. In preferred embodiments, the VFL shroud 52 defines a sleeve 56 having a lengthwise extending bore 58 operable for housing the laser diode 54 at one end, the adapter 200 at a medial portion thereof, and for receiving the mechanical splice connector 10 at the opposing end into the adapter 200. In order to insure that the mechanical splice connector 10 is appropriately spaced from the laser diode 54 of the VFL 50, the bore 58 may define an interior chamfer 59 operable for engaging the outer surface of the adapter 200 and preventing further movement within the shroud 52 toward the laser diode 54.

The laser diode 54 (i.e., a Helium-Neon (HeNe) gas laser) of the VFL 50 is provided for generating and delivering the light energy through the adapter 200 and to the termination area of the mechanical splice connector 10, thereby causing the mechanical splice joint to "glow" so that the amount of optical power emanating from the termination area can be detected and collected, and subsequently compared to the predetermined threshold level. While the light energy from the VFL 50 is typically a visible wavelength light, the VFL 50 may produce light energy having any wavelength, including invisible wavelength light, because the light energy from the VFL 50 is delivered to an opto-electronic circuit having means for collecting the light energy and converting the optical power to an electrical power that is delivered to the feedback display 46 defining a display indicative of an acceptable splice termination. In short, the apparatus and methods of the invention provide an electronic verification at the termination area. In contrast, the use of the conventional CTS including a VFL relies on an operator to observe and subjectively interpret the amount of visible wavelength light emanating from the termination area. Accordingly, the results obtained using a conventional CTS are subject to considerable variability and inconsistency depending on a number of factors, including variations in the ambient light, variations in the translucence of different fiber optic connectors, the condition of the VFL and the adapter, the subjectivity of the operator, and the variability introduced by different operators conducting the test for different splice terminations under different test conditions.

The VFL shroud 52 is slidably mated with the carriage 32 and is capable of slidable movement in a direction generally parallel to the longitudinal bore of the ferrule 12, such that the shroud 52 may be positioned to cover the connector 10. When in the covered position, the laser diode 54 of the VFL 50 is positioned to be a predetermined distance away from the adapter 200. Accordingly, the laser diode 54 may emit optical signals through the adapter 200 and into the termination area.

Figure 5:
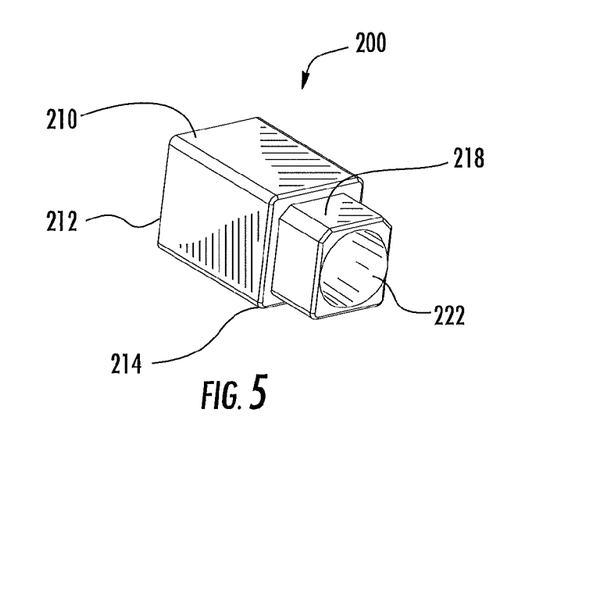
FIG. 5 is an environmental perspective view of an adapter operable for use in a visual fault locater or mounted upon a mechanical splice connector in accordance with a preferred embodiment of the present invention.
Figure 6:
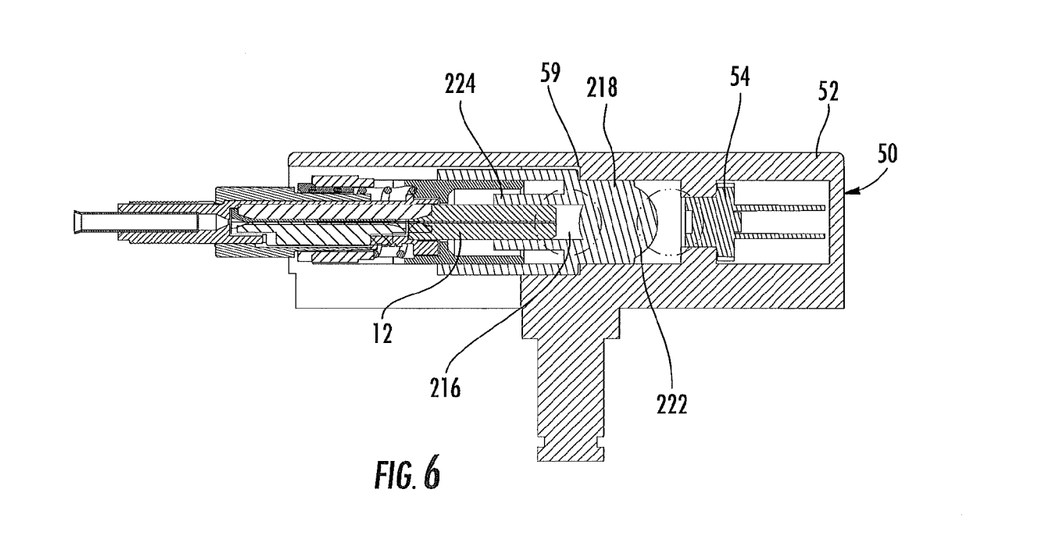
FIG. 6 is a lengthwise cross-sectional view of a conventional field-installable mechanical splice connector to be mounted on an end portion of a field optical fiber, the splice connector being disposed within the visual fault locater such that a ferrule of the connector is received within an adapter and the connector comprising the ferrule, a stub optical fiber extending rearwardly from the ferrule, a pair of opposed splice components for receiving and aligning the end portions of the stub optical fiber and the field optical fiber and a cam member for engaging the splice components, shown with the cam member in the un-actuated position.

In preferred embodiments of the present invention, the adapter 200 is removably secured within a medial portion of the shroud 52 of the VFL 50 and is operable for enabling the testing of the continuity of the optical splice connection. Preferably, the adapter 200 is configured to receive the end face 11 of the ferrule 12. It will be understood by those skilled in the art that while the present configuration of the adapter 200 shows a design operable for receiving a ferrule having a 2.5 mm size, it may be configured to receive multiple connector types, including those with different ferrule diameters. Referring now to FIGS. 5-6, the universal adapter 200 according to one embodiment of the present invention is depicted. As previously stated, the adapter 200 serves to provide optical coupling between the termination area of the mechanical splice connector 10 and the VFL 50 of the installation tool 30. Specifically, the adapter 200 receives and aligns the ferrule 12 of the connector 10 with the laser diode 54 of the VFL 50. The adapter 200 includes a sleeve 210 that extends lengthwise between opposed first and second ends 212, 214. While the sleeve 210 is depicted to have a generally square outer surface, the sleeve 210 can be shaped differently as long as the sleeve 210 securely fits within the VFL 50 and does not interfere with the reception of the ferrule 12. As depicted in more detail in FIG. 6, the sleeve 210 defines a lengthwise extending bore 216 that opens through the first end 212 for receiving at least a portion of the ferrule 12.

The adapter 200 also includes an end member 218 for closing the second end 214 of the sleeve 210. While the end member 218 and the sleeve 210 can be discrete components, the end member 218 and the sleeve 210 are typically integrally formed, such as by molding. At least the end member 218 is translucent such that optical signals emitted from the laser diode 54 can be transmitted therethrough. Although the end member 218 can be formed of a variety of materials having different optical transmissivities, the end member 218 is preferably formed of a material that is relatively optically clear. In order to improve the optical transmissions, the end member 218 of the adapter 200 is preferably a lens 222. More preferably, the lens 222 is integral with the remainder of the end member 218 and is formed of the same material and is operable for focusing the incident light upon the end of the optical fibers upon which the ferrule 12 is mounted. By focusing the incident light upon the optical fibers located at the end face 11 of the ferrule 12, the light is transmitted through the optical fibers to the termination area. Regardless, the lens 222 is shaped so as to focus incoming optical signals from the laser diode 54. Preferably, the lens 222 is a generally spherical lens proximate the outer surface of the end member 218. While the inner surface of the end member 218 can be flat or planar, the end member 218 can also include an inner lens, such as a generally spherical lens. As also illustrated, the outer lens preferably has a diameter that exceeds the diameter of that portion of the bore 216 proximate the second end 214 of the sleeve 210 to insure that the outer lens effectively collects the incoming and outgoing optical signals. For example, the outer lens may cover the entire outer surface of the end member 218, if so desired. The lens 222 may be designed to have any desired optical characteristics, including any desired magnification and focal length. In one embodiment, however, the outer lens has a magnification of 2 times and a focal length that coincides with the end face 11 of the ferrule 12.

In order to insure that the end face 11 of the ferrule 12 is appropriately spaced from the second end 214 of the sleeve 210 and, more particularly, from the lens 222, the sleeve 210 may define an internal chamfer 224 for engaging the ferrule 12. As shown in FIG. 5, for example, the medial portion of the sleeve 210 may define an internal chamfer 224 that extends radially inward. In one embodiment, the internal chamfer 224 also extends in an axial direction such that the chamfer is disposed at an angle, such as 30 degrees, relative to the longitudinal axis defined by the bore 216. As illustrated, the portion of the bore 216 extending between the first end 212 of the sleeve 210 and the internal chamfer 224 typically has a larger diameter than the portion of the bore 216 extending between the internal chamfer 224 and the second end 214 of the sleeve 210. In this regard, the first portion of the bore 216 generally has the same shape as the portion of the ferrule 12 upon which the adapter 200 will be mounted.

The end face 11 of the ferrule 12 is inserted into the first end 212 of the sleeve 210 and adapter 200 is advanced over the ferrule 12. The adapter 200 is typically slid over the ferrule 12 until the ferrule 12 or, as shown in FIG. 6, the ferrule chamfer contacts the internal chamfer 224 of the adapter 200. Once the adapter 200 is properly seated upon the ferrule 12, the end face 11 of the ferrule 12, including the ends of the optical fibers (not shown) upon which the ferrule 12 is mounted, is disposed within the second portion of the bore 216.

By permitting the continuity of the splice termination to be checked within the VFL 50, the method of this aspect of the present invention prevents certain contaminants and other debris from being deposited upon the end face 11 of the ferrule 12, the likelihood of which would be increased as a result of the electrical charging of the ferrule 12 that would occur if the adapter 200 was slideably removed from the ferrule 12 before testing. In addition, the method of this aspect of the invention also simplifies the continuity test somewhat by not requiring the operator to remove and subsequently replace the adapter 200. In alternative embodiments, the adapter 200 may be mounted upon the fiber optic connector 10 prior to being placed upon the installation tool 30. In this embodiment, the adapter 200 also serves the function of a removable dust cap for preventing contaminants and debris from being deposited upon the ferrule 12.

Referring again to FIGS. 2-4, the installation tool 30 also includes a collecting means 41 (FIG. 4) for collecting the optical energy propagated by the VFL 50 and emanating from the termination area of the mechanical splice connector 10. The collecting means 41 is preferably located in the lower portion of the tool housing 34. Alternatively, the collecting means 41 may be positioned proximate and, more specifically, immediately adjacent the termination area of the mechanical splice connector 10 in order to collect a sufficient amount of the light energy at the termination area. The collecting means 41 may be any photo-sensitive device, such as a photodetector, photo-transistor, photo-resistor, optical integrator (e.g., integrating sphere), or the like. The collecting means 41 detects the amount of glow emanating from the termination area and collects the light energy, preferably in the form of optical power. The collecting means 41 converts the collected optical power to electrical power utilizing the conventional opto-electronic circuit (not shown) and delivers an electrical signal to the feedback display 46. The opto-electronic circuit preferably includes a predetermined threshold value for the termination stored therein. If the collected optical power meets the predetermined value, the electrical signal sent to the feedback display 46 indicates an acceptable termination. If not, an unacceptable termination is indicated. Many other devices and methods for collecting the amount of light energy emanating from the termination are well within the ordinary skill of the art and are intended to be included within the broad scope of the invention. Therefore, the scope of the invention should not be construed as being limited by the particular example of collecting means or their respective methods of operation shown and described herein.

The feedback display 46 is operable for displaying an indication of either an acceptable or unacceptable termination. Although the terms "display(s)" and "displaying" are used throughout this written specification and in the appended claims, it is contemplated that the feedback display 46 may provide a visual, audio, or any other sensory (for example vibratory) indication to the operator so that the apparatus may be utilized in any conceivable work environment. Examples of a suitable feedback display 46 include, but are not limited to, a series of Light Emitting Diodes (LEDs), a Liquid Crystal Display (LCD), an analog gauge, a mechanical needle or similar pointer, an electrical scale, an audible signaling device, and any other device for providing a perceptible signal that is not generated or determined by the subjective interpretation of the operator. Merely for purposes of explanation and convenience, the feedback display 46 has been described herein as displaying a visual indication.

The camming handle 62 of the installation tool 30 is provided so as to be slidably engaged and outwardly biased with a side of the tool housing 34. The camming handle 64 is preferably outwardly biased by a spring type mechanism (not shown) located within the lower portion 38 of the tool housing 34. Further, the camming handle 62 preferably includes a rack gear 64 that extends outwardly therefrom and into the side of the tool housing 34 so as to be matingly engaged with the spur gear wrench 42 of the carriage 32. The camming handle 62 is operable for being compressed inwardly, thereby actuating and rotating the spur gear wrench 42 at the rack gear 64. As a result thereof, the cam member 20 may be actuated creating the optical coupling. The crimping handle 70 is provided so as to be slidably engaged and outwardly biased with a second side of the tool housing 34. The crimping handle 70 is preferably outwardly biased by a spring type mechanism (not shown) located within the lower portion 38 of the tool housing 34. Further, the crimping handle 70 is operable for being compressed and preferably includes a means for actuating and retaining the crimp tube about the strain relieving buffer 25 of the field optical fiber 14, thereby providing strain relief to the termination. Once the camming handle 62 and the crimping handle 70 are compressed, they lock in place against the respective sides of the installation tool 30. Thereafter, the handles, 62, 70, may be released and unlocked by actuating a release button 35 located upon the tool housing 34. By actuating the release button 35, the spring type mechanisms of the handles 62, 70, force the handles 62, 70 outwardly such that they return to their decompressed state.

Figure 7:
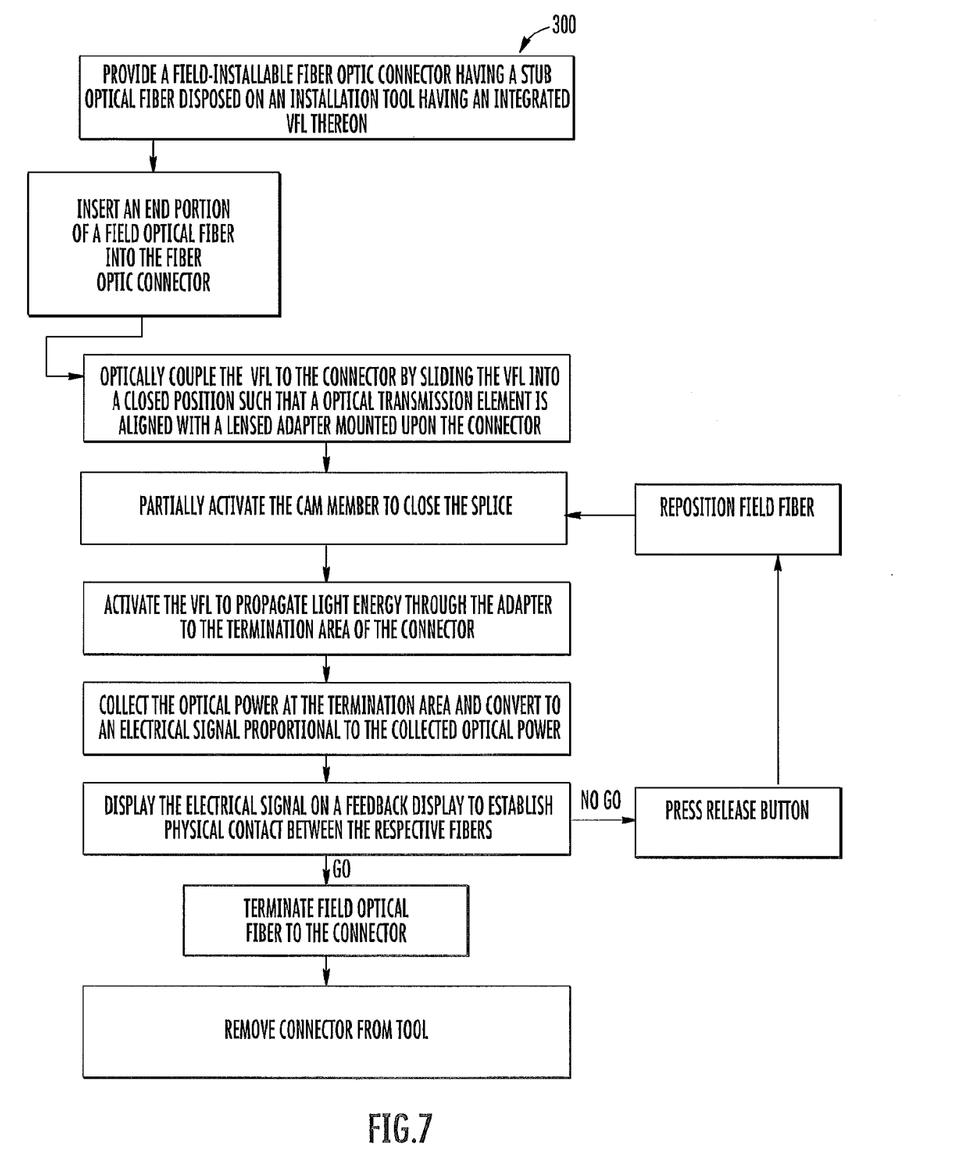
FIG. 7 is a flow chart illustrating a preferred method for verifying an acceptable splice termination in accordance with the present invention.

Referring now to FIG. 7, a flowchart 300 illustrating a preferred method of performing a mechanical splice and verifying an acceptable termination is shown. A fiber optic mechanical splice connector 10 is first loaded onto the carriage 32 of the tool housing 34. Thereafter, the field optical fiber 15 is inserted through the rear of the connector 10 such that is in physical contact with the stub optical fiber 14. The cam member 20 is actuated or partially actuated to close the splice by compressing the camming handle 62, thereby moving or rotating and actuating the cam member 20 and forming the splice termination. Specifically, the spur gear wrench 42 rotates a predetermined number of degrees (e.g., about ninety degrees (90°) clockwise) around the longitudinal axis of the fiber optic connector 10 so that the cam member 20 is in the actuated position and the field optical fiber 15 is secured within the connector 10. The VFL shroud 52 is then slid into a closed position such that the ferrule 12 of the connector 10 is received within the adapter 200 of the VFL 50. The activation device is then activated such that the laser diode 54 emits an optical signal through the lens 222 of the adapter 200 into the termination area. The collecting means 41 collects the light energy emanating from the termination area and determines if the termination is acceptable by comparing the collected optical power to the pre-programmed threshold value. Thereafter, the feedback display 46 indicates an acceptable or unacceptable termination to the operator. In the case of an acceptable termination and a "go" display, the crimping handle 70 is actuated to crimp the tube and provide strain relief for the field optical fiber 15. The VFL shroud 52 is then slid to the open position and the installed connector 10 is removed from the installation tool 30.

In the case of an unacceptable termination and a "no go" signal, a release button is pressed and the cam member 20 is rotated back to the unactuated position, thus allowing the field optical fiber 15 to be removed and re-inserted and re-positioned within the connector 10. Once re-positioned, the cam member 20 is once again moved to the actuated position. Light is again introduced to the termination point, emanating light is collected and measured, and the reading is compared to the pre-programmed threshold value to indicate and acceptable or unacceptable termination. An acceptable termination lights the "go" display to the operator, and unacceptable termination lights the "no go" display to the operator. A termination is reversible without destruction to the connector because the continuity verification is determined prior to crimping.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. An installation tool for performing and verifying a splice termination, comprising:
    a holder operable for receiving a fiber optic connector, the fiber optic connector having a stub optical fiber disposed within a ferrule and being operable for terminating a field optical fiber inserted into the fiber optic connector at a termination area of the fiber optic connector;
    a camming handle slidably engaged and outwardly biased from a tool housing for performing the splice termination;
    an optical power generator comprising an optical transmission element for propagating light energy to the termination area;
    an opto-electronic circuit having means for collecting the light energy of the amount of glow emanating from the fiber optic connector at the termination area and converting optical power of the collected light energy to an electrical power; and
    a feedback display for indicating the status of the termination, wherein the opto-electronic circuit includes a predetermined threshold value for the termination, and further wherein the light energy collected from the termination area is compared to the predetermined threshold value stored in the tool so the feedback display can provide a go or no go signal for the termination;
    wherein:
        the fiber optic connector is a mechanical splice connector comprising a cam member for terminating the field optical fiber to the fiber optic connector;
        the camming handle is operable for being compressed inwardly relative to the tool housing to actuate the cam member of the fiber optic connector;
        the holder includes a cam actuator;
        the camming handle includes a rack gear engaged with the cam actuator; and
        the cam actuator comprises a spur gear wrench.

2. The apparatus of claim 1, wherein the optical power generator is a Visual Fault Locator and the optical transmission element is a laser, the Visual Fault Locator comprising a cover slidably disposed on the holder.

3. The apparatus of claim 1, further comprising an adapter configured to receive the fiber optic connector and to align the fiber optic connector with the optical transmission element such that the optical transmission element is spaced apart from the fiber optic connector at a predetermined distance and is in optical communication with the stub optical fiber for propagating the light energy through the adapter and along the stub optical fiber to the termination area.

4. The apparatus of claim 3, wherein the adapter comprises a sleeve extending lengthwise between opposed first and second ends, said sleeve defining a lengthwise extending bore that opens through the first end for receiving at least a portion of the ferrule and having an end member for closing the second end of said sleeve, said end member comprising a lens that is at least partially translucent for permitting optical communication with the stub optical fiber.

5. The apparatus of claim 1, wherein the means for collecting is selected from the group consisting of a photodetector, a photo-transistor, a photo-resistor, an optical integrator and one or more fiber optic strands.

6. The apparatus of claim 1, wherein the feedback monitor is selected from the group consisting of a series of Light Emitting Diodes (LEDs), a Liquid Crystal Display (LCD), an analog gauge, a mechanical needle or similar pointer, an electrical meter, an electrical scale and an audible signaling device.

7. The apparatus of claim 1, wherein the mechanical splice connector further comprises a pair of opposing splice components and the cam member is operable for securing the field optical fiber relative to the stub optical fiber between the splice components.

8. The apparatus of claim 1, wherein the feedback display includes a pair of indicators for providing the go or no go signal.

9. An installation tool for performing and verifying a splice termination, comprising:
- a holder operable for receiving a fiber optic connector, the fiber optic connector having a stub optical fiber disposed within a ferrule and being operable for terminating a field optical fiber inserted into the fiber optic connector at a termination area;
- a camming handle slidably engaged and outwardly biased from a tool housing for performing the splice termination;
- an optical power generator comprising an optical transmission element for propagating light energy to the termination area;
- an opto-electronic circuit having means for collecting the light energy of the amount of glow emanating from the fiber optic connector at the termination area and converting optical power of the collected light energy to an electrical power; and
- a feedback display for indicating the status of the termination, wherein the opto-electronic circuit includes a predetermined threshold value for the termination, and further wherein the feedback display includes a pair of indicators for indicating an acceptable splice termination or an unacceptable termination based upon a comparison of the collected light energy to the predetermined threshold value;
- wherein:
  - the fiber optic connector is a mechanical splice connector comprising a cam member for terminating the field optical fiber to the fiber optic connector;
  - the camming handle is operable for being compressed inwardly relative to the tool housing to actuate the cam member of the fiber optic connector;
  - the holder includes a cam actuator;
  - the camming handle includes a rack gear engaged with the cam actuator; and
  - the cam actuator comprises a spur gear wrench.

10. The apparatus of claim 9, wherein the optical power generator is a Visual Fault Locator and the optical transmission element is a laser, the Visual Fault Locator comprising a cover slidably disposed on the holder.

11. The apparatus of claim 9, further comprising an adapter configured to receive the fiber optic connector and to align the fiber optic connector with the optical transmission element such that the optical transmission element is spaced apart from the fiber optic connector at a predetermined distance and is in optical communication with the stub optical fiber for propagating the light energy through the adapter and along the stub optical fiber to the termination area.

12. The apparatus of claim 11, wherein the adapter comprises a sleeve extending lengthwise between opposed first and second ends, said sleeve defining a lengthwise extending bore that opens through the first end for receiving at least a portion of the ferrule and having an end member for closing the second end of said sleeve, said end member comprising a lens that is at least partially translucent for permitting optical communication with the stub optical fiber.

13. The apparatus of claim 9, wherein the means for collecting is selected from the group consisting of a photodetector, a photo-transistor, a photo-resistor, an optical integrator and one or more fiber optic strands.

14. The apparatus of claim 9, wherein the mechanical splice connector further comprises a pair of opposing splice components and the cam member is operable for securing the field optical fiber relative to the stub optical fiber between the splice components.

15. An installation tool for performing and verifying a splice termination, comprising:
- a holder operable for receiving a fiber optic connector, the fiber optic connector having a stub optical fiber disposed within a ferrule and being operable for terminating a field optical fiber inserted into the fiber optic connector at a termination area, wherein the fiber optic connector is a mechanical splice connector comprising a cam member for terminating the field optical fiber to the fiber optic connector, and further wherein the holder includes a cam actuator;
- a camming handle operably coupled to the cam actuator and thereby configured to actuate the cam member of the fiber optic connector;
- the cam actuator comprises a spur gear wrench;
- an optical power generator comprising an optical transmission element for propagating light energy to the termination area;
- an opto-electronic circuit configured to collect the light energy of the amount of glow emanating from the fiber optic connector at the termination area and convert optical power of the collected light energy to an electrical power; and
- a feedback display for indicating the status of the termination, wherein the opto-electronic circuit includes a predetermined threshold value for the termination, and further wherein the feedback display is configured to indicate an acceptable splice termination or an unacceptable termination based upon a comparison of the collected light energy to the predetermined threshold value.

16. The apparatus of claim 15, wherein the camming handle includes a rack gear engaged with the cam actuator.

* * * * *